:::
United States Patent [19]

Sikes et al.

[11] Patent Number: 5,260,414
[45] Date of Patent: Nov. 9, 1993

[54] SPIROBISLACTONE ACRYLATE POLYMERS

[75] Inventors: Allison M. Sikes, Martinsville, Va.; Robert F. Brady, Jr., Gaithersburg, Md.

[73] Assignee: The United States of America as represented by the Secretary of the Navy, Washington, D.C.

[21] Appl. No.: 904,096

[22] Filed: Jun. 25, 1992

[51] Int. Cl.$^5$ .............................. C08G 63/08
[52] U.S. Cl. .................... 528/354; 528/93; 528/116; 549/344
[58] Field of Search ............. 528/93, 116, 354; 549/344

[56] References Cited

U.S. PATENT DOCUMENTS

| | | | |
|---|---|---|---|
| 4,064,086 | 12/1977 | Cowsar et al. | 528/354 |
| 4,939,251 | 7/1990 | Wang | 540/489 |
| 5,057,590 | 10/1991 | Sikes et al. | 528/116 |

OTHER PUBLICATIONS

Pariza et al., Synthetic Communications, vol. 13(3), pp. 243–254 (1983)-ordered*.
Sikes et al., "Controlled Shrinkage Polymers: Characterization of Epoxy Resins Cured With Spirobislactones", Journal of Polymer Science: Part A: Polymer Chemistry, vol. 28, 2533–2546 (1990).

*Primary Examiner*—John Kight, III
*Assistant Examiner*—T. Mosley
*Attorney, Agent, or Firm*—Thomas E. McDonnell; George A. Kap

[57] ABSTRACT

This invention is directed to a thermoplastic polymer that is solid at room temperature and which expands on further polymerization, to form a crosslinked polymer, and to a process for preparing the polymer and the crosslinked polymer. In a preferred embodiment the polymer is prepared by polymerizing 10–90 but preferably 20–80 mole percent of a lower alkyl acrylic monomer containing a spirobislactone moiety, 10–90 but preferably 20–80 mole percent of a lower alkyl acrylic monomer containing an epoxide moiety, and 0.1–5 but preferably 0.5–1 mole percent of a lower alkyl acrylic monomer containing a functional moiety chosen from primary amino, secondary amino, mercaptan, and hydroxyl groups which can initiate crosslinking with the spirobislactone moiety. The crosslinked polymer is devoid of a spirobislactone carbonyl absorption band and is insoluble in conventional organic solvents.

22 Claims, No Drawings

SPIROBISLACTONE ACRYLATE POLYMERS

FIELD OF INVENTION

This invention relates to crosslinked and uncrosslinked polymers containing a spirobislactone moiety which polymers are solid at room temperature and expand on crosslinking.

DESCRIPTION OF PRIOR ART

Atoms which touch but are not bonded to each other are separated by the sum of their van der Waals radii, a distance that is greater than the distance of a covalent bond. For instance, the carbon in two —$CH_2$— groups not bonded to each other may not be closer than 4.0 Angstroms, but two carbons bonded to each other are 1.54 Angstroms apart. In the polymerization of ethylene to form polyethylene, the shrinkage is 60%.

Conventional addition polymerization proceeds with shrinkage, for atoms at a nonbonded contact distance must become much closer to form a covalent bond in the polymer. Shrinkage can form voids, cracks, and other defects which shorten the life of the polymer. One strategy to avoid shrinkage is to use a proportion of expanding bicyclic monomers in the reaction mixture. Suitable so-called "expanding monomers" contain two or more rings joined at a common carbon atom and functional groups so situated that a reaction can initiate multiple bond breaking with atom pairs moving apart in a number which exceeds the number of atom pairs moving together. This produces expansion. For this reason, polymerizations in which two or more bonds are broken for each new bond formed are being evaluated.

It is believed that nearly one hundred expanding monomers of this type have been prepared and polymerized; however, few of them are spirobislactones. Not all such polymerization reactions are straightforward, however, and two major complications have been documented. First, multiple ring opening is not the preferred pathway for all polymerizations. Examples are reported in which monomers react by opening of only one ring, by addition polymerization through vinyl groups, by elimination reactions, and by combinations of these pathways. The volume of the reaction products does not increase when any of these pathways dominate.

A second complication arises because ring-opening reactions of polycyclic monomers are appreciably faster than addition polymerization of certain conventional resins. Thus all ring-opening takes place when the resin mass is liquid, and the resin subsequently cures with its characteristic shrinkage.

Therefore, in order for double ring-opening reactions to achieve their potential in controlling volume change during polymerization and crosslinking or curing, it is necessary to use a monomer which reacts exclusively by a double ring-opening pathway. It is also essential to ensure that the monomer reacts after a solid polymer matrix has been formed, so that volume changes take place in a solid phase.

U.S. Pat. No. 5,057,590 to Sikes and Brady discloses spirobislactone-epoxy copolymers and a process for copolymerizing an epoxy resin and a spirobislactone. The resulting copolymers are syrupy at room temperature and do not form films. Furthermore, since the reaction products are syrupy when the rings of a spirobislactone break, the change in volume cannot be ultilized to improve the properties of the cured solid polymers.

SUMMARY OF THE INVENTION

It is an object of this invention to prepare solid polymers by polymerization of monomers containing an acrylate and a spirobislactone moieties;

It is another object of this invention to prepare solid polymers containing a spirobislactone moiety which have no or reduced shrinkage after crosslinking;

It is another object of this invention to prepare crosslinked polymers useful as insoluble films and other objects;

It is another object of this invention to produce thermoplastic polymers which are soluble in organic solvents but which become insoluble in organic solvents after crosslinking.

These and other objects of this invention are accomplished in a preferred embodiment by copolymerizing unsaturated monomers containing an epoxy moiety in a monomer, a spirobislactone moiety in another monomer, and a functional moiety in still another monomer which can initiate polymerization by a nucleophilic attack on the carbonyl carbon of the spirobislactone moiety, followed by curing of the resulting polymers at an elevated temperature to obtain crosslinked polymers which are resistant to organic solvents.

DETAILED DESCRIPTION OF INVENTION

This invention is directed to spirobislactone polymers which are solid at room temperature and which can be thermally crosslinked to an insoluble thermosetting state. More specifically, this invention pertains to solid polymers which contain a spirobislactone expanding monomer moiety, an epoxide ring moiety, and a functional moiety which initiates polymerization.

The film-forming spirobislactone polymer which is solid at room temperature contains a spirobislactone moiety, an epoxide ring moiety, and a functional moiety X, as depicted below:

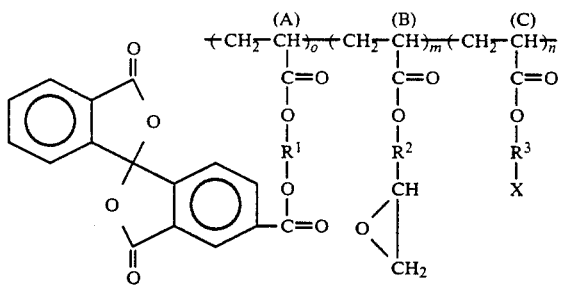

where the sum of n, m, and o is great enough to form a solid polymer at room temperature and is greater than 3, and is believed to be 10 to 150; and $R^1$, $R^2$ and $R^3$ are each individually selected from substituted and unsubstituted alkylene groups of 1 to 20 carbon atoms, substituted and unsubstituted unsaturated aliphatic hydrocarbon groups of 1 to 20 carbon atoms, and substituted and unsubstituted cyclic groups of 3 to 14 carbon atoms. In a preferred embodiment, $R^1$, $R^2$, and $R^3$ are individually selected from unsubstituted alkylene groups of 1 to 8 carbon atoms. The X in the above structural formula is the functional group selected from primary amino- (—$NH_2$), secondary amino(—$NHR^4$), mercaptan- (—SH), or hydroxyl(—OH). The functional group —X must contain a hydrogen atom in order to initiate crosslinking with said spirobislactone moiety. For this reason, tertiary amino groups are not suitable since they do not contain a hydrogen atom and do not initiate cross-linking reaction with the spirobislactone moiety. The $R^4$ in the functional moiety—$NHR^4$ is any group which makes the moiety secondary amino. The phenyl rings of the spirobislactone moiety can be substituted or unsubstituted, the substituents being selected from aryl, preferably phenyl groups; hydrocarbon, preferably alkyl groups of 1 to 8 carbon atoms; halogen, preferably chlorine and bromine groups; and ether groups —$OR^5$, in which $R^5$ is aryl or alkyl groups, as described above.

In the above polymer, in a preferred embodiment, repeating unit (A) can be supplied by the monomer ethyl acrylate spirobislactone or another alkyl acrylate spirobislactone monomer containing 3-12, preferably 3-9 carbon atoms, especially lower alkyl acrylate monomers containing 3-6 carbon atoms, excluding carbon atoms in the spirobislactone moiety; repeating unit (B) can be supplied by monomer glycidyl acrylate or another glycidyl alkyl acrylate monomer containing 3-12, preferably 3-9 carbon atoms, especially lower alkyl acrylate monomers containing 3-6 carbon atoms, excluding carbon atoms in the epoxide moiety; and repeating unit (C) can be supplied by monomer 4-hydroxybutyl acrylate or another hydroxy alkyl acrylate monomer containing 3-12, preferably 3-9 carbon atoms, and especially lower alkyl acrylate monomers containing 3-6 carbon atoms. Polymerization will take place whether the pendant spirobislactone moiety, which characterizes repeating unit (A), is supplied by the same or different monomers that supply repeating unit (B), which provides the pendant epoxide moiety, and the repeating unit (C), which supplies the pendant hydroxyl or another functional moiety which initiates polymerization. Same applies to the other moieties in the polymer. For reasons which will become apparent later, it is preferred to keep the functional group, such as the hydroxyl moiety, on a different monomer than the spirobislactone moiety.

The monomer ethyl acrylate spirobislactone is 4-(acryloxyethyleneoxycarbonyl)-7,7'-dioxo-2,2'-spirobi(-benzo[c]tetrahydrofuran) which is prepared by reacting spirobislactone acid with 2-hydroxyethyl acrylate. The spirobislactone acid, which is the spirobislactone moiety with a hydrogen atom on the carboxyl group in the repeating unit (A) of the polymer, can be prepared by reacting phthalic anhydride and p-xylene in the presence of aluminum chloride to form a substituted benzophenone which is then oxidized and cyclized to the spirobislactone acid. The specific procedure for preparing spirobislactone acid is as follows: phthalic anhydride in amount of 100 grams (676 millimoles) was added to 550 milliliters of p-xylene in a 2-liter flask equipped with a water-cooled condenser and was stirred until most of it dissolved. The solution was cooled in ice water and powdered aluminum chloride in amount of 200 g (1.50 mol) was added in one portion. The solution was warmed slowly until evolution of hydrogen chloride slackened, heated to 90° C. over a period of 45 minutes, was kept at this temperature for 2.5 hours, and then cooled in an ice bath. Ice was added slowly followed by concentrated hydrochloric acid in amount of 150 mL, and the mixture was steam-distilled to remove unreacted p-xylene. Aluminum salts were removed by filtration and washed with cold water which was combined with the filtrate. Sodium carbonate in the amount of 50 g in 1 L of water was added, the liquid was warmed rapidly and then was filtered while hot. Addition of 130 mL of 50% aqueous sulfuric acid precipitated the product as an oil that crystallized when cold. The substituted benzophenone product in amount of 140 g or 551 mmol (82% yield) was recrystallized from toluene, had melting point of 140°-145° C. and was characterized by infrared spectroscopy.

The spirobislactone acid was prepared from the substituted benzophenone as follows: to 350 mL of 5% aqueous sodium hydroxide solution containing 20.2 g or 80 mmol of the substituted benzophenone, produced as described above, was added dropwise 49 g or 310 mmol of potassium permanganate in 1.2 L of water, and the mixture was refluxed for about 9 hours and cooled. The cooled mixture was filtered to remove manganese dioxide and then boiled to diminish its volume. Addition of about 60 mL of 50% aqueous hydrochloric acid precipitated 20.0 g of the spirobislactone acid and its related tricarboxylic acid as an oily solid, which was washed with water until the washings were neutral and then dried. The oven-dried product was suspended in a solution of 200 mL 2-methoxymethyl ether solvent and 25 mL benzene solvent and the solution was refluxed for about 2 hours with 3.4 g Dowex 50X8-100 resin (H+) catalyst until evolution of water ceased. Water of reaction was removed in a water separator. The mixture was filtered while still warm at about 40° C. to remove the catalyst, and addition of 1 L of cold water to the reaction solution precipitated the spirobislactone acid. The precipitate was filtered and washed with cold water until all traces of mixed solvents were removed yielding 18.0 g or 61 mmol (76% yield) of white crystals having melting point of 285°-293° C. The product was the spirobislactone acid, characterized by infrared spectroscopy and microanalysis, and it has the following structure:

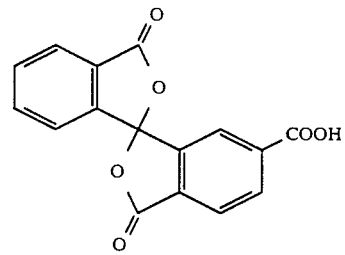

The above structure without hydrogen in the carboxyl group gives the spirobislactone moiety contained in repeating unit (A) in the polymer or copolymer or terpolymer disclosed above.

The monomer which yields repeating unit (A) in the spirobislactone acrylic polymer disclosed herein was prepared as follows: the spirobislactone acid in amount of 9.17 g or 31.0 mmol, prepared as described above, and 3.57 g or 30.8 mmol of 2-hydroxyethyl acrylate were dissolved in 200 mL of tetrahydrofuran. Powdered 4-dimethylaminopyridine in amount of 3.89 g or 31.9 mmol was added to the solution, followed by 7.50 g or 36.4 mmol of dicyclohexyl carbodiimide dissolved in 50 mL of tetrahydrofuran. The reaction was very exothermic, and a precipitate formed within 2 minutes. After 16 hours, the precipitate was filtered and tetrahydrofuran was removed in a flash evaporator. The residue was dissolved in methylene chloride, and the resulting solution was washed three times with 200 mL portions of water, twice with 10% hydrochloric acid, twice with 2.5% sodium bicarbonate, and three times with water. The organic layer was dried over anhydrous magnesium sulfate and stored at −20° C. for 24 hours, which caused dicyclohexyl urea to precipitate. The liquid was then filtered and evaporated to dryness, yielding 6.61 g or 16.8 mmol (55% yield) of a white chalky solid with a melting point of 243°-245° C., which was acrylate spirobislactone or 4-(acryloxyethyleneoxycarbonyl)-7,7'dioxo-2,2'spirobi(benzo[c]tetrahydrofuran).

Preparation of the spirobislactone acrylic terpolymer was accomplished as follows: a slurry was prepared of 299 mg or 0.76 mmol of the ethyl acrylate spirobislactone, prepared as described above, 2.58 g or 20 mmol of glycidyl acrylate, (also 2,3-epoxypropylacrylate) and 27 mg or 0.19 mmol of 4-hydroxybutyl acrylate, in 7 mL of tetrahydrofuran. The slurry was prepared by stirring components thereof at 70° C. under nitrogen. A catalyst, azobis(isobutyronitrile), in amount of 4 mg was added with mixing to the slurry and a solution was formed within 5 minutes. A precipitate began to form within 10 minutes of adding the catalyst. After 4 hours, an infrared spectrum of the liquid from the reaction mixture showed only trace absorption at 1635 cm$^{-1}$, indicating that all acrylate groups had been consumed. At this time, the reaction mixture was filtered, the precipitate was washed with hexane and dried to yield 3.5 g (97% yield) of an off-white solid polymer. The polymer did not melt below 350° C. but sintered and became discolored above 280° C., probably as a result of crosslinking reactions. The polymer was characterized by infrared spectroscopy. The polymer corresponded to the general polymer structure given above with $R^1$ being —$CH_2$—$CH_2$—, $R^2$ being —$CH_2$—, $R^3$ being —$CH_2$—$CH_2$—$CH_2$—$CH_2$—, and X being the hydroxy group on carbon 4 of the $R^3$ group.

The crosslinking reaction of the polymer defined herein is believed to proceed in two steps. In the first step, reaction of a hydroxyl group with a spirobislactone carbonyl carbon forms an ester and opens both of the lactone rings, producing a benzophenone carbonyl group and a carboxylic acid. In the second step, the acid so formed reacts with an oxirane or epoxide ring to form an ester and a hydroxyl group. The hydroxyl group produced in the second step repeats the first step of the reaction with a carbonyl carbon of another spirobislactone. In this way, a chain reaction is produced which results in a crosslinked polymer that is solid at room temperature.

It is possible to make polymeric compositions using the above monomers but varying their proportions over wide ranges, however, it is also possible to use other monomers as long as the resulting polymer contains a spirobislactone moiety, an epoxide moiety, and a hydroxyl moiety or another functional moiety which initiates the reaction with the spirobislactone moiety. The monomer mixture which polymerizes to form the polymer defined above contains a glycidyl-functional monomer to provide the epoxide moiety in the repeating unit of polymer, a hydroxyl-functional monomer to provide the hydroxyl moiety in the repeating unit of the polymer, and a 4-oxycarbonyl-7,7'-dioxo-2,2'spirobi(benzo[c]tetrahydrofuran)-functional monomer, which provides the spirobislactone moiety in the repeating unit of the polymer. Although at least three, and preferably three, comonomers are contemplated in the polymerization reaction to prepare the polymer defined herein, it should be understood that one monomer can contain more than one functional group in which case, less than the three required functional monomers will be needed to prepare the spirobislactone polymer defined herein. On the basis of functional monomers used to prepare the spirobislactone polymer defined herein, the amount of monomer A, which provides repeating units A in the polymer, is 10–90 mole percent, preferably 20–80%, on the basis of monomers A and B; the amount of monomer B, which provides repeating units B in the polymer, is 10–90 mole percent, preferably 20–80% on the basis of monomers of A and B; and the amount of monomer C, which provides repeating units C in the polymer, is 0.1–5 mole percent, preferably 0.5–1 mole percent, on the basis of combined amounts of A and B in moles.

It should be understood that the spirobislactone polymer defined herein may contain other monomers which are not acrylates and which may not contain functional groups which would interfere with the polymer formation or with the crosslinking reaction. Such other monomers include, but are not limited to, vinyl acetate, vinyl chloride, ethylene, propylene, and styrene. Other acrylic and methacrylic monomers can be used in place of the specific acrylic monomers exemplified herein and other acrylic and methacrylic monomers containing no groups which would interfere with the polymer formation or with the crosslinking reaction. Such other acrylic and methacrylic monomers include, but are not limited to, methyl acrylate, ethyl acrylate, acrylonitrile, methyl methacrylate, and ethyl methacrylate.

The monomers can be polymerized by many methods to produce the desired spirobislactone polymers. Such methods include, but are not limited to, anionic, cationic, and free-radical polymerization as well as polymerizations catalyzed by microwaves, ions, heat or light. In a preferred embodiment, the monomers are polymerized in a free-radical reaction initiated by catalysts such as azobis(isobutyronitrile), benzoyl peroxide, or tertiary butyl peroxide. The spirobislactone polymers defined herein are stable at room temperature and thus can be used in conventional industrial polymerization processes.

Pigments, fillers and reinforcing fibers and fabrics may be added to the spirobislactone polymer to produce colored coatings or composites. Small amounts of other materials may be added to improve the ease of handling, storage stability, crosslinking behavior, or other properties of the uncured or uncrosslinked polymer defined herein. Examples of reinforcing fibers include natural, cellulosic, carbon, glass, acrylic, nylon, and polyester fibers. Examples of natural fibers are cotton and wool. Most artificial fibers can be obtained as woven or unwoven fabric, a very long continuous filament, tow (a bundle of filaments), or as staple, made by cutting the continuous filament into relatively short segments. Natural fibers, with the exception of silk, are obtained in the form of staple.

The crosslinking reaction of spirobislactone polymers can be carried out by catalysis, using sulfides, amines, and phosphines and by microwaves, heat, and light. In a specific example, the spirobislactone polymer prepared above was crosslinked as follows: 1.5 g of the spirobislactone polymer prepared above was dissolved in 1.5 g of methyl ethyl ketone and cast as a film on a 76 mm × 152 mm steel panel. At this point, the film could easily be removed by rubbing with a cotton ball soaked in methyl ethyl ketone. The steel panel was placed in an oven at 120° C. for 24 hours, during which time crosslinking took place. A Fourier Transform infrared (FTIR) spectrum of the starting film showed the spirobislactone carbonyl band at 1792 cm$^{-1}$. This band was absent in the FTIR spectrum of the heat-treated or crosslinked polymer film but new bands at 1729 cm$^{-1}$ and 1675 cm$^{-1}$ appeared. The band at 1729 cm$^{-1}$ denotes an ester moiety and the band at 1675 cm$^{-1}$ denotes a diphenyl ketone moiety. After the polymer was crosslinked, the coating could not be removed by vigorous rubbing with a cotton ball soaked in methyl ethyl ketone or in any other organic solvent. This resistance to organic solvents makes the spirobislactone polymers defined herein suitable for coatings and linings where resistance to organic fuels, lubricants, and solvents is paramount.

Although crosslinking of the spirobislactone polymer, as described above, was carried out at 120° C. for 24 hours, generally, thermal crosslinking of spirobislactone polymers defined herein can be carried out over the temperature range of 50°–300° C. for the duration of up to several days, preferably at 100°–250° C. for a duration of 1–24 hours. It is well recognized that it takes less time to crosslink a spirobislactone polymer at a higher temperature. It is possible to adjust the rate and extent of the crosslinking reaction by controlling the proportion of the spirobislactone, epoxide, and the functional group moieties in the polymers.

In recapitulation of the preferred embodiment described above, the acrylic spirobislactone monomer was prepared by condensing hydroxyethyl acrylate with the spirobislactone acid. The acrylic spirobislactone monomer was copolymerized with 4-hydroxybutyl acrylate and glycidyl acrylate to produce the spirobislactone terpolymer. The spirobislactone terpolymer before crosslinking is a solid rather than a syrup at room temperature. Thus, the spirobislactone terpolymer can be used as a conventional acrylic resin. A solution of the terpolymer can be applied to various surfaces and evaporated to form a dry film of an acrylic polymer. This film has potential practical uses but in its uncrosslinked state, it can be redissolved in the same solvent used to form it. As already described, crosslinked spirobislactone terpolymer film lacks the carbonyl absorption band of the spirobislactone functional group and cannot be redissolved in the same solvent used to form the film.

It is important to bear in mind that in the present invention, a solid polymer phase is formed first and ring-opening polymerization takes place within the solid phase. The solid polymer does not flow or deform easily, and thus almost all of the increase in volume generated by the ring openings in the spirobislactone moiety is available to offset the shrinking and cracking which sometimes is caused by crosslinking.

What we claim:

1. Acrylic copolymer containing at least one spirobislactone moiety, said copolymer is solid at room temperature and has the following structure

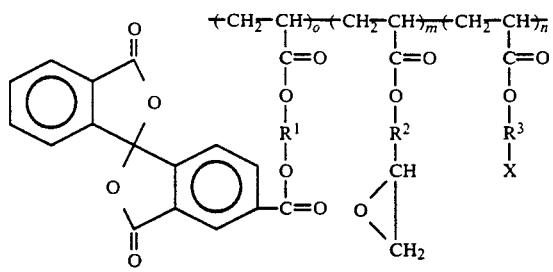

where the sum of n+m+o is large enough to form a solid polymer at room temperature; $R^1$, $R^2$ and $R^3$ are individually selected from substituted and unsubstituted alkylene groups of 1 to 20 carbon atoms, substituted and unsubstituted unsaturated hydrocarbon groups of 1 to 20 carbon atoms, and substituted and unsubstituted cyclic groups of 3 to 14 carbon atoms; and —X is selected from functional groups which can initiate crosslinking with said spirobislactone moiety; amount of the repeating units supplying said spirobislactone moiety is 10–90 mole percent; amount of the repeating units supplying the epoxide moiety is 10–90 mole percent; and amount of the repeating units supplying the functional group is 0.1–5 mole percent, based on the repeating units supplying said spirobislactone and epoxide moieties.

2. Polymer of claim 1 wherein $R^1$, $R^2$ and $R^3$ are individually selected from alkylene groups of 1 to 8 carbon atoms; X is selected from primary amino (—NH$_2$), secondary amino (—NHR$^4$), mercaptan (—SH) and hydroxyl (—OH) groups, where $R^4$ is any group which makes —NHR$^4$ a secondary amino group; amount of said repeating units supplying said spirobislactone moiety is 20–80 mole percent; amount of said repeating units supplying said epoxide moiety is 20–80 mole percent; and amount of said repeating units supplying said hydroxyl moiety is 0.5–1.0%, based on the repeating units supplying said spirobislactone and epoxide moieties.

3. Polymer of claim 1 wherein $R^1$ is —CH$_2$—CH$_2$—, $R^2$ is —CH$_2$—, $R^3$ is —CH$_2$—CH$_2$—CH$_2$—CH$_2$—, X is the hydroxyl (—OH) group, and the amount of repeating units supplying said spirobislactone moiety and the amount of units supplying said epoxide moiety is about equal, on molar basis.

4. Crosslinked polymer of claim 1.

5. Crosslinked polymer of claim 2 devoid of carbonyl absorption band of said spirobislactone moiety at 1792 cm$^{-1}$ but having new bands at 1729 cm$^{-1}$ and at 1675 cm$^{-1}$.

6. Crosslinked polymer of claim 3 devoid of carbonyl absorption band of said spirobislactone moiety at 1792 cm$^{-1}$ but having new bands at 1729 cm$^{-1}$ and at 1675 cm$^{-1}$.

7. A process for preparing a polymer comprising a polyacrylic backbone; a first organic side chain esterified to said polyacrylic backbone, said first organic side chain including a pendant spirobislactone moiety having an oxygen atom connected directly to the spiro carbon; a second organic side chain esterified to said polyacrylic backbone, said second organic side chain including a pendant epoxide moiety; a third organic side chain esterified to said polyacrylic backbone, said third acrylic side chain including a pendant functional moiety capable of initiating polymerization reaction with said spirobislactone moiety; said process comprising the steps of reacting at least one unsaturated monomer containing said spirobislactone moiety, at least one unsaturated monomer containing said epoxide moiety, and at least one unsaturated monomer containing said functional moiety that can react with said spirobislactone moiety to prepare a polymer that is solid at room temperature, amount of said monomer(s) containing said spirobislactone moiety is 10-90 mole percent, amount of said monomer(s) containing said epoxide moiety is 10-90 mole percent, and amount of said monomer(s) containing said functional moiety is 0.1-5 mole percent, based on the combined moles of said monomer(s) containing said spirobislactone moiety and said monomer(s) containing said epoxide moiety.

8. Process of claim 7 carried out in an inert atmosphere wherein amount of said monomer(s) containing said spirobislactone moiety is 20-80 mole percent, amount of said monomer(s) containing said epoxide moiety is 20-80 mole percent, and amount of said monomer(s) containing said functional moiety is 0.5-1 mole percent, wherein said functional moiety is selected from primary amino group —$NH_2$, secondary amino group —$NHR^4$, mercaptan group —SH, and hydroxyl group —OH, where $R^4$ is any group which makes —$NHR^4$ a secondary amine group.

9. Process of claim 8 wherein said functional moiety is selected from primary amino group —$NH_2$, secondary amino group —$NHR^4$, mercaptan group —SH, and hydroxyl group —OH, where $R^4$ is any group which makes —$NHR^4$ a secondary amino group, said process further including the step of heating said polymer at 50°-350° C. for up to several days until said spirobislactone moiety becomes devoid of carbonyl absorption band at 1792 $cm^{-1}$.

10. Process of claim 8 further including the step of heating said polymer at 100°-250° C. for a duration of 1-24 hours.

11. Process of claim 10 wherein said polymer is prepared by polymerizing at least three different monomers, the first monomer containing said spirobislactone moiety, the second monomer containing said epoxide moiety, and the third monomer containing said functional moiety.

12. A polymer comprising: polyacrylic backbone; a first organic side chain esterified to said polyacrylic backbone, said first organic side chain including a pendant spirobislactone group; a second organic side chain esterified to said polyacrylic backbone, said second organic side chain including a pendant epoxide group; a third organic side chain esterified to said polyacrylic backbone, said third acrylic side chain including a pendant functional group capable of initiating polymerization reaction with said spirobislactone group.

13. Polymer of claim 12 wherein said functional group is selected from primary amino group —$NH_2$, secondary amino group —NHR, mercaptan group —SH, hydroxyl group —OH, and mixtures thereof.

14. Polymer of claim 13 wherein said functional group is hydroxyl group —OH; and wherein said polymer expands upon crosslinking.

15. Polymer of claim 14 wherein said spirobislactone group is derived from monomers selected from acrylic monomers containing 3-12 carbon atoms excluding the carbon atoms in said spirobislactone group, said epoxide group is derived from monomers selected from acrylic monomers containing 3-12 carbon atoms excluding the carbon atoms in said epoxide group, and said hydroxyl group is derived from monomers selected from acrylic monomers containing 3-12 carbon atoms.

16. Polymer of claim 15 wherein said monomer(s) containing said spirobislactone group contain 3-9 carbon atoms excluding the carbon atoms in said spirobislactone group, said monomer(s) containing said epoxide group contain 3-9 carbon atoms excluding the carbon atoms in said epoxide group, and said monomer(s) containing said hydroxyl group contain 3-9 carbon atoms.

17. Polymer of claim 16 wherein said monomer containing said spirobislactone group is 4-(acryloxyethyleneoxycarbonyl)-7,7'dioxo-2,2'-spirobi(benzo[c]tetrahydrofuran), said monomer containing said epoxide group is glycidyl acrylate, and said monomer containing said hydroxyl group is 4-hydroxybutyl acrylate.

18. Crosslinked polymer of claim 12.
19. Crosslinked polymer of claim 14.
20. Crosslinked polymer of claim 16.

21. Polymer of claim 16 devoid of carbonyl absorption band of said spirobislactone group at 1792 $cm^{-1}$ but having new bands at 1721 $cm^{-1}$ and at 1675 $cm^{-1}$ and which is insoluble in organic solvents.

22. Polymer of claim 12 wherein said polyacrylic backbone comprises

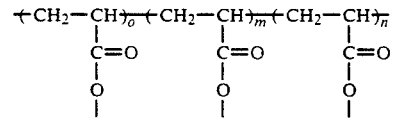

wherein the sum of n, m, and o is large enough to form a solid polymer at room temperature; and said first organic side chain comprises an ester of said spirobislactone group and has the formula

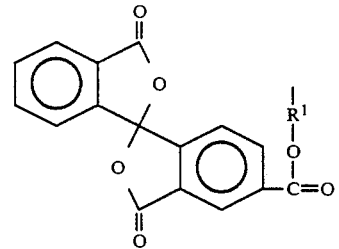

wherein $R^1$ is selected from alkylene groups of 1 to 8 carbon atoms and is esterified to said polyacrylic backbone, at an end of $R^1$ opposite said spirobislactone group, by bonding to the acyl group of said backbone.

* * * * *